April 14, 1964     M. E. PACKARD ETAL     3,129,389
QUANTUM RESONANCE STABILIZED FREQUENCY SOURCE
Filed Aug. 7, 1961
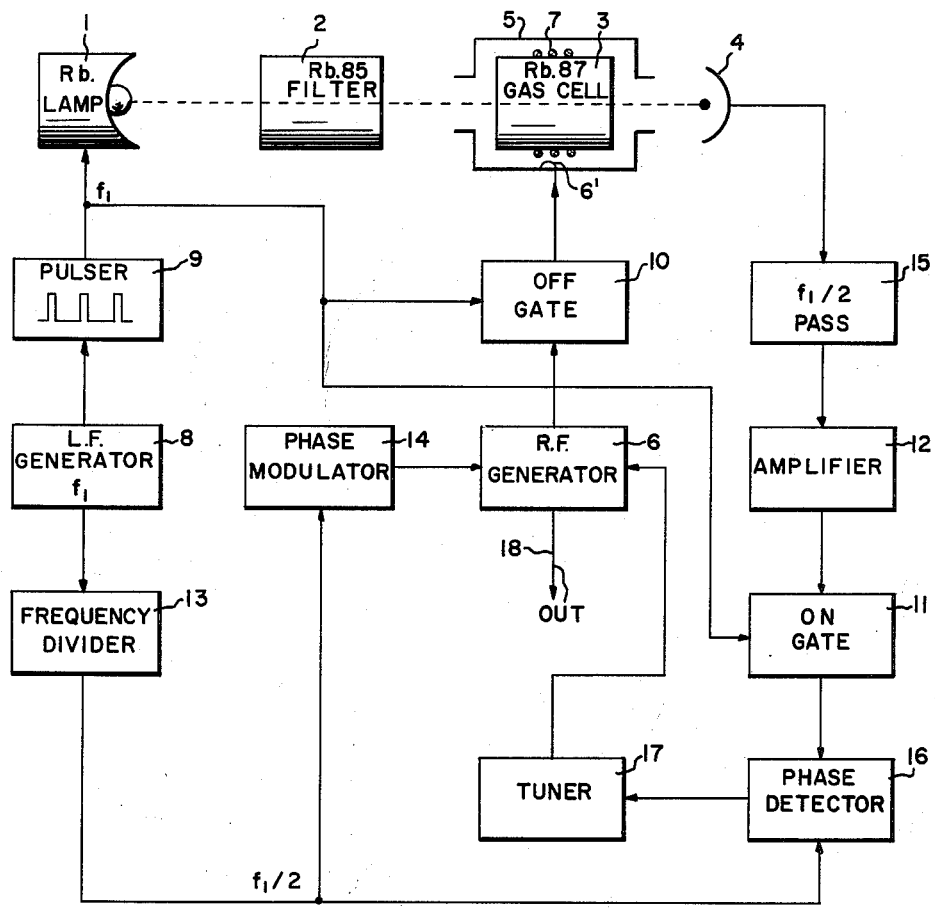
INVENTORS
MARTIN E. PACKARD
ARNOLD L. BLOOM
WILLIAM E. BELL 3,129,389
QUANTUM RESONANCE STABILIZED
FREQUENCY SOURCE
Martin E. Packard and Arnold L. Bloom, Menlo Park, and William E. Bell, Palo Alto, Calif., assignors to Varian Associates, Palo Alto, Calif., a corporation of California
Filed Aug. 7, 1961, Ser. No. 129,873
14 Claims. (Cl. 331—3)

The present invention relates in general to electronic devices such as frequency standards, magnetometers, and spectrometers, which utilize quantum resonance effects, and more particularly to a novel pulsed light technique for effecting and/or monitoring the alignment of a sample of quantum mechanical particles undergoing radio frequency resonance transitions.

In such devices, it is often desirable to irradiate a sample of quantum mechanical particles undergoing resonance transitions between radio frequency separated sublevels with optical radiation. For example, optical radiation with such spectral characteristics (frequency-intensity distribution, propagation direction, and polarization) as to be more strongly absorbed by certain sublevels than other sublevels, may be used to build up a net non-equilibrium sublevel population distribution or alignment by a process known as optical pumping wherein atoms or other quantum mechanical particles in the more absorbing sublevels absorb the optical radiation and re-radiate to the less absorbing sublevels. This net alignment is then utilized for radio frequency interaction, for example, with an external generator, or with the stimulated emission of the particles themselves. Furthermore, the optical radiation which is absorbed or scattered by the sample may be detected to monitor the condition of radio frequency resonance, as such resonance causes a net re-alignment among the sublevels. Although optical radiation may be used for both aligning and monitoring, in some cases it may be desirable to use some other aligning process (for example, energy-selective particle bombardment) and use optical radiation for monitoring only, or alternatively to use optical radiation for aligning only and use some other process (for example, the absorption of radio frequency energy) to provide an indication of the condition of resonance.

Previously, it has been the usual practice to irradiate the quantum mechanical particles simultaneously with both the optical and radio frequency radiation. Such simultaneous irradiation has been found to be subject to the disadvantages that the linewidth which determines the stabilizing effectiveness of the radio frequency resonance is broadened by high intensity optical radiation, and, even more seriously, particularly in the case of frequency standards, that the absolute value of the resonance frequency of stabilization is undesirably dependent on the intensity and quality of the optical radiation which may vary, for example due to lamp aging and/or excitation conditions.

It is the principal object of the present invention to overcome these and other limitations with novel pulsing techniques.

One feature of the present invention is the provision of a stabilized radio frequency source including means periodically pulsing a sample undergoing radio frequency transitions with optical irradiation at a low pulsing frequency for reducing undesired interaction between said optical radiation and said radio frequency transitions.

Another feature of the present invention is the provision of a stabilized frequency source in accordance with the preceding paragraph including optical detection means for stabilizing the frequency of an external radio frequency generator to the resonance frequency of said radio frequency transitions.

Another feature of the present invention is the provision of a stabilized frequency source including means for gating off the external generator when the optical irradiation is pulsed on.

Another feature of the present invention is the provision of a stabilized frequency source including means for gating on the optical detection means only when the optical irradiation is pulsed on.

Still another feature of the present invention is the provision of a stabilized frequency source including means for cyclically frequency modulating the output of the radio frequency generator at one-half the frequency at which the optical irradiation is pulsed, so that said generator may be maintained at resonance by the optical signal component at said one-half frequency.

These and other features and advantages of the present invention will become more apparent upon a perusal of the following specification taken in connection with the accompanying drawing illustrating a resonance stabilized frequency standard in accordance with the present invention.

Generally speaking, the advantages of the present invention are attained by periodically pulsing the optical radiation light irradiating a quantum mechanical sample so as to avoid the undesirable consequences of interaction between this radiation and the radio frequency (R.F.) energy effecting sublevel transitions of the sample.

Consider in particular the case wherein the optical radiation is used to align or pump the sample. The light is pulsed on at maximum intensity for a period somewhat longer than the thermal relaxation time $T_1$ of the sample in the presence of light to thereby completely pump the sample and remove the phase memory of preceding effects of the R.F. fields. For an alkali metal vapor sample mixed with a high pressure inert buffer gas (greater than about 1 mm. Hg) to enhance the alignment in ground state sublevels and to improve the sensitivity of optical absorption monitoring of magnetic resonance transitions between such sublevels, this period is typically on the order of 1–5 milliseconds. In the interval between pulses, the R.F. intensity is adjusted such that it realigns or de-pumps the sample by virtue of resonance transitions. The interval will not normally be longer than about one-half the transverse relaxation time $T_2$ in the absence of light (typically 0.05 sec. in the alkali vapor example), and may be somewhat shorter for high R.F. intensities.

To stabilize the frequency of an external generator supplying the R.F. energy, a signal obtained from the sharp change at resonance of either the energy absorbed from the R.F. source, the light scattered from the sample, or the light transmitted through the sample without absorption, is used to maintain the tuning of the generator at the resonance frequency via a feedback control. The light detection methods have the advantage of utilizing an intrinsic R.F. to optical photon energy multiplication; and the transmitted light detection, in particular, which is used in the illustrative embodiment of the present invention, has the further advantage of permitting the detected light to be better collimaed and focused, thereby improving the detection sensitivity. Using such transmission monitoring, the initial amplitude of the light transmitted through the sample during each pulse varies inversely with the extent to which the R.F energy has re-aligned the sample by putting the excess population of the non-absorbing sublevels back into the absorbing sublevels. The degree of re-alignment depends, in turn, on the proximity of the R.F. energy to the quantum resonance frequency, and this information is used to stabilize the R.F. generator at said frequency.

In addition to eliminating the line-broadening and shifting effects previously noted, such a pulsed light system may have a sensitivity per linewidth which is at least as large as that available with continuous light systems. Further, in the continuous system the signal amplifier noise sets a lower limit on the usable light intensity and linewidth, whereas in the pulsed system this has no relation to linewidth and in addition the amplifier may be gated off in between light pulses, if desired, to further decrease noise when no signal is being received.

One transition of particular interest, is the so-called 0→0 microwave frequency transition between the $m=0$ sublevels of the two ground level hyperfine states in an alkali metal vapor. As this frequency is substantially independent of weak environmental magnetic fields, it is useful in frequency standard applications. The frequency of other transitions between the hyperfine state and also of the Zeeman transitions between sublevels of the same hyperfine state, depends directly on the magnetic field intensity at the sample, and so these transitions are most useful in magnetometer applications where the frequency of the stabilized R.F. generator provides an indication of said intensity.

Referring to the drawing, there is shown a frequency standard according to the present invention utilizing the 6834 mc. 0→0 transition in rubidium-87. This transition was chosen for the illustrative embodiment because of the convenient ambient temperature of rubidium vapor and also the ability to effect hyperfine pumping and monitoring with a rubidium-85 filter cell.

Rubidium spectral lamp 1 emits a beam of optical resonance radiation at approximately 7900 A. which is successively directed through a rubidium-85 vapor cell 2 which filters out the lower energy hyperfine components of the beam, through a buffered rubidium-87 gas cell 3, the lower ($F=1$) hyperfine state atoms of which are more strongly absorbed by the filter beam than the higher ($F=2$) hyperfine state atoms, and finally impinges on a photocell 4, for example, a silicon solar cell. The gas cell 3 is disposed in a cavity resonator 5 tuned to the 0→0 hyperfine frequency of the buffered atoms, approximately 6834 megacycles, the resonator 5 being energized at this frequency by R.F. generator 6 through coupling loop 6'. Cell 3 is preferably magnetic shielded, and a small residual magnetic field is established along the beam axis by means of a coil 7 to emphasize and provide some control over the frequency of the 0→0 transition.

A low frequency generator 8 providing a signal at a frequency $f_1$ of, for example, 262 cycles drives a pulsing network 9 to provide a chain of pulses, for example of 1 millisecond duration, to periodically pulse on the lamp 1 at a pulse repetition rate $f_1$. For example, the lamp 1 may comprise a rubidium vapor bulb placed in the tank coil of an oscillator including cross coupled triodes, the grids of which are negatively biased beyond cut-off. The positive pulses from pulser 9 gate the oscillator on and excite an electrodeless discharge in the bulb which is extinguished between pulses.

The pulser 9 may also be used to drive an off-gate circuit 10 for decoupling the generator 6 while the light pulse is on, and an on-gate 11 which couples the signal amplifier 12 to the photocell 4 only when the light pulse is on. The gate circuit 10 serves to complete the isolation between the R.F. and optical radiation in the cell 3 and enables the use of longer duty cycle pulsing, whereas the gate 11 serves to decrease the effect of amplifier noise as previously discussed.

A second output of low frequency generator 8 is coupled through a frequency divider 13 to a circuit 14 for phase modulating the R.F. generator 6, thereby providing a corresponding frequency modulation of the cavity output 6' at $\frac{1}{2}f_1$. The relative phases between the two outputs of the generator 8 are adjusted so that the lamp is pulsed on each time the frequency modulation amplitude passes through zero. Thus the initial amplitude of the signal received by photocell 4 during each pulse is responsive to the re-aligning or de-pumping effect of the R.F. generator 6 during the preceding half-cycle. If the frequency of the R.F. generator 6 is precisely at the hyperfine resonance frequency of the rubidium atoms in the cell 3, then each half-cycle will have the same de-pumping influence so that the pulses received by the photocell 4 are uniform, and the photocell output, which then has a fundamental frequency component $f_1$ but no $\frac{1}{2}f_1$ component, is blocked by the filter circuit 15. If the frequency of the generator 6 deviates from the resonance, however, the de-pumping effects of the two half-cycles of the frequency modulation are not the same, so that pulses of alternating amplitude are received by the photocell 4 and the photocell signal has a $\frac{1}{2}f_1$ frequency component whose amplitude depends upon the extent of deviation and whose phase depends on the direction of deviation. This $\frac{1}{2}f_1$ component is passed by the filter 15, amplified by amplifier 12, and fed to phase detector 16 which derives a $\frac{1}{2}f_1$ reference signal from frequency divider 13. The output of the phase sensitive detector 16 is a D.C. feedback control signal used to drive a tuner 17 which maintains the frequency of the generator 6 at the resonance value. The generator 6 may contain a frequency synthesis circuit for scaling down the stabilized microwave frequency 6' to a more convenient crystal-controlled output frequency 18 on the order of 1 megacycle.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Quantum resonance apparatus comprising: a sample of quantum mechanical particles; radio frequency generating means for effecting resonance transitions between sublevels of different hyperfine states of said particles; means for irradiating said sample with optical radiation; and means for periodically pulsing on said optical irradiation means at a low frequency; and means for decoupling said radio frequency generating means simultaneously with the pulsing on said irradiation means whereby undesired interaction between the optical radiation and radio frequency transitions is reduced.

2. The apparatus of claim 1 wherein said optical radiation means is pulsed on at maximum intensity for a time sufficient to align said sample by optical pumping.

3. The apparatus of claim 1 further including means for detecting to the intensity of optical radiation which passes through said sample without absorption.

4. The apparatus of claim 1 wherein said quantum mechanical particles are alkali atoms in vapor form.

5. A quantum resonance stabilized frequency source comprising: a sample of quantum mechanical particles; a radio frequency generator for effecting radio frequency sublevel transitions in said sample; means for irradiating said sample with optical radiation; means periodically pulsing said optical irradiation means at a low frequency for reducing undesired interaction between said optical radiation and said radio frequency transition; means for optically detecting the amount of interaction between said optical irradiation and said sample; and means for controlling the frequency of said radio frequency generator in response to the detected interaction; and means for decoupling said radio frequency generator when said optical irradiation means is pulsed on.

6. A frequency source according to claim 5 wherein said optical detection means comprises means for detecting the intensity of said optical radiation which has passed through said sample without absorption.

7. A frequency source according to claim 6 including means for pulsing on said optical irradiation means at maximum intensity for a time sufficient to align said sample by optical pumping.

8. A frequency source according to claim 7 wherein said sample contains an alkali metal vapor mixed with a high pressure buffer gas.

9. A frequency source according to claim 8 wherein said radio frequency transitions are transitions between different ground state hyperfine levels of said alkali vapor.

10. A frequency source according to claim 9 wherein said hyperfine transitions are the field independent 0→0 transitions.

11. A frequency source according to claim 10 wherein said alkali vapor is a rubidium-87 vapor, and further including a filter cell of rubidium-85 vapor, said optical radiation comprising rubidium optical resonance radiation which is passed through said rubidium-85 filter cell before irradiating said rubidium-87 sample.

12. A quantum resonance stabilized frequency source comprising: a sample of quantum mechanical particles; a radio frequency generator for effecting radio frequency sublevel transitions in said sample; means for irradiating said sample with optical radiation; means for periodically pulsing said optical irradiation means at a low frequency for reducing undesired interaction between said optical radiation and said radio frequency transition; means for optically detecting the amount of interaction between said optical irradiation and said sample; means responsive to said latter quantity for controlling the frequency of said radio frequency generator; and means for gating off the sample output of said radio frequency generator during the time said optical irradiation is pulsed on.

13. A quantum resonance stabilized frequency source comprising: a sample of quantum mechanical particles; a radio frequency generator for effecting radio frequency sublevel transitions in said sample; means for irradiating said sample with optical radiation; means for periodically pulsing said optical irradiation means at a low frequency for reducing undesired interaction between said optical radiation and said radio frequency transition; means for optically detecting the amount of interaction between said optical irradiation and said sample; means responsive to said latter quantity for controlling the frequency of said radio frequency generator; and means for gating on said optical radiation detection means only during the time said optical radiation is pulsed on.

14. A quantum resonance stabilized frequency source comprising: a sample of quantum mechanical particles; a radio frequency generator for effecting radio frequency sublevel transitions in said sample; means for irradiating said sample with optical radiation; means for periodically pulsing said optical irradiation means at a low frequency for reducing undesired interaction between said optical radiation and said radio frequency transition; means for optically detecting the amount of interaction between said optical irradiation and said sample; means responsive to said latter quantity for controlling the frequency of said radio frequency generator; and means for cyclically frequency modulating the sample output of said radio frequency generator at a frequency which is one-half the frequency at which said optical radiation is pulsed whereby said optical detection means contains an output component at said one-half frequency which is responsive to deviations of said frequency generator from the resonance frequency of said sublevel transitions.

References Cited in the file of this patent

UNITED STATES PATENTS

| | | |
|---|---|---|
| 2,927,278 | Dicke | Mar. 1, 1960 |
| 2,968,007 | Hansen et al. | Jan. 10, 1961 |
| 3,038,126 | Robison | June 5, 1962 |